United States Patent [19]

Nagase et al.

[11] 4,451,771

[45] May 29, 1984

[54] APPARATUS FOR CONTROLLING AC MOTOR

[75] Inventors: Hiroshi Nagase, Hitachi; Hisakazu Ninomiya, Funabashi; Satoshi Ibori, Narashino, all of Japan

[73] Assignee: Hitachi, Ltd., Tokyo, Japan

[21] Appl. No.: 458,057

[22] Filed: Jan. 14, 1983

[30] Foreign Application Priority Data

Jan. 18, 1982 [JP] Japan .................................. 57-5017

[51] Int. Cl.$^3$ .............................................. H02P 5/40
[52] U.S. Cl. .................................. 318/800; 318/802; 318/799; 363/37
[58] Field of Search .............................. 318/798–811; 363/36, 37

[56] References Cited

U.S. PATENT DOCUMENTS

| | | | |
|---|---|---|---|
| 3,824,437 | 7/1974 | Blaschke | 318/800 |
| 4,125,796 | 11/1978 | Nagase et al. | 318/800 |
| 4,310,791 | 1/1982 | Akamatsu | 318/800 |
| 4,314,190 | 2/1982 | Walker et al. | 318/803 |
| 4,320,331 | 3/1982 | Plunkett | 318/802 |
| 4,327,315 | 4/1982 | Kawada et al. | 318/803 |
| 4,330,741 | 5/1982 | Nagase et al. | 318/803 |
| 4,344,025 | 8/1982 | Okuyama et al. | 318/803 |
| 4,358,726 | 11/1982 | Iwakane et al. | 318/798 |
| 4,388,577 | 6/1983 | Blaschke et al. | 318/803 |

*Primary Examiner*—Gene Z. Rubinson
*Assistant Examiner*—Arthur G. Evans
*Attorney, Agent, or Firm*—Antonelli, Terry & Wands

[57] ABSTRACT

Disclosed is a control apparatus for an AC motor which is driven by a power converter constituted by switching elements. A current control circuit turns on/off the switching elements in accordance with a current pattern signal in the form of an AC signal to thereby control the motor current. The current pattern signal is obtained by a current pattern calculating circuit based on a current command signal and a sinusoidal signal which determines the current phase. A current correction signal proportional to the deviation of the motor current from the current command signal is obtained by a current correction control circuit and added to the current command signal to be applied to the current pattern calculating circuit.

3 Claims, 5 Drawing Figures

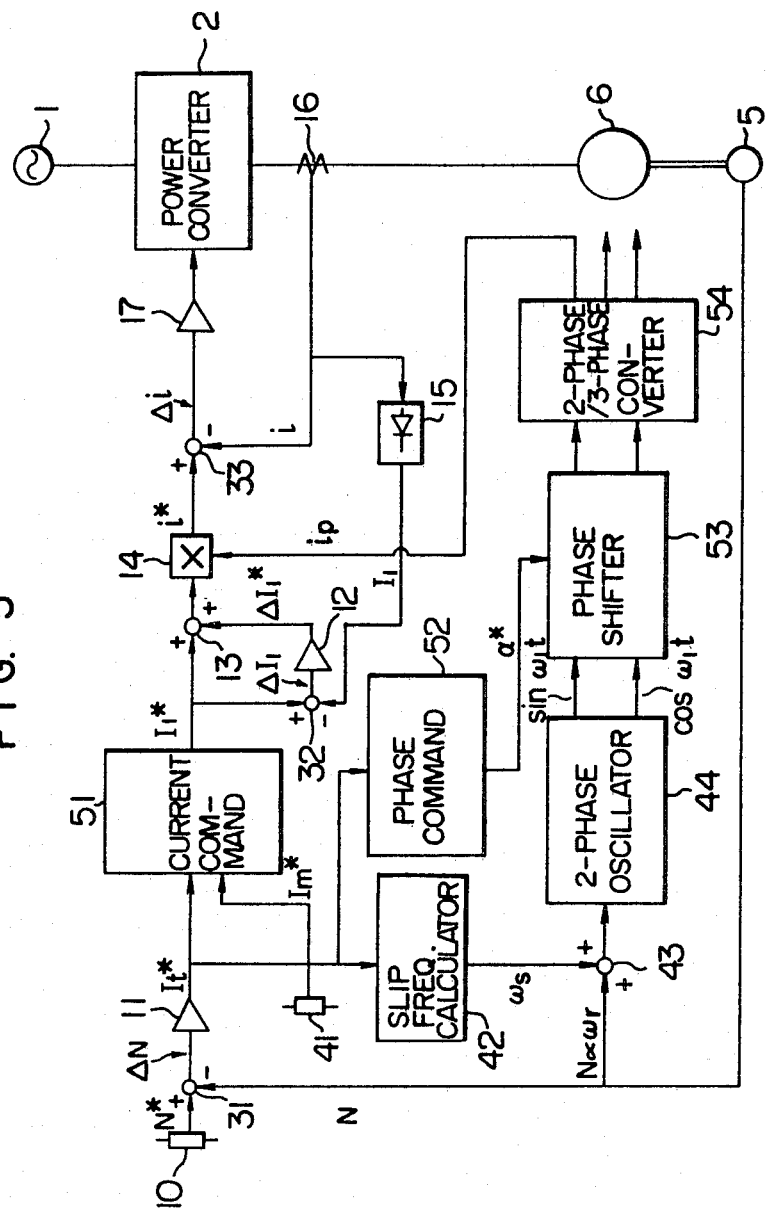
F I G. 5

APPARATUS FOR CONTROLLING AC MOTOR

The invention relates to a control apparatus for an AC motor driven by a power converter, and in particular to an AC motor control apparatus having a current control system.

An AC motor is driven by means of a power converter by controlling the motor current (instantaneous value) by turning on/off switching elements constituting the power converter. The motor current is controlled by the function of a current control system which operates on the basis of the relation between a given current command signal (AC signal) and a received current detection signal.

There is of cource limitation in switching speed of the switching elements, such as thyristors, gate turn-off thyristors, constituting the power converter. The current control system controls the magnitude of the motor current by turning on/off the switching elements. Accordingly, there is limitation in frequency response in the current control system due to the limitation in switching speed of the switching elements, so that the system has inherent response delay. Calculating the frequency response in a current control system, it can be found that it is actually impossible to select the motor current to be large enough to be able to disregard the response delay when the AC motor is driven with its rated frequency.

If there is such response delay in the current control system, the motor current becomes smaller than the current command value and the phase of the same lags, thereby causing inconvenience that the torque of the motor becomes insufficient, the motor speed drops, and the velocity control system becomes unstable. This becomes a serious problem as the operating frequency of the motor becomes higher.

To solve such a problem, it has been known to provide, at the major side of a current control circuit, a current pattern calculating circuit for decomposing the motor current into a component in the same direction as the magnetic flux of the field system and another component in the direction perpendicular to the first-mentioned direction so as to obtain, by calculation, a current pattern signal necessary for generating desired torque. This is known, for example, by U.S. Pat. No. 4,125,796, entitled "CONTROL APPARATUS FOR USE IN A SYNCHRONOUS MACHINE," particularly by FIG. 6 thereof.

In the point of view of the stability in motor control, however, it is required to make more lagging the response of the current pattern calculation control system than that of the current control system. To control an AC motor, usually, a velocity control system is provided as a major loop. This, it is necessary to cause the response of the velocity control system to lag than that of the current pattern calculation control system. As the result, an avoidable problem is caused that the response of the velocity control system should be deteriorated. Further, there arises a practical problem that since three control systems are required to be provided, it is necessary to design these systems taking account of the stability of the whole system and correlating these three systems with each other, resulting in complexity in design, in adjusting, etc.

An object of the invention is to provide an AC motor control apparatus, in which the motor torque can be controlled to a desired value with simple configuration and without lowering the response in velocity control.

The present invention is featured in that a deviation of an actual motor current from a current command value is added to the current command value to obtain a corrected current command value which is supplied to a current control circuit.

Other objects and features of the present invention will be apparent from the description which will be made hereunder in conjunction with appended drawings, in which:

FIG. 5 is a block diagram illustrating the circuit configuration of a different embodiment of the present invention.

FIG. 1 shows an embodiment in which the present invention is applied to a control apparatus for driving a synchronous motor by using a power converter.

Figure 1:
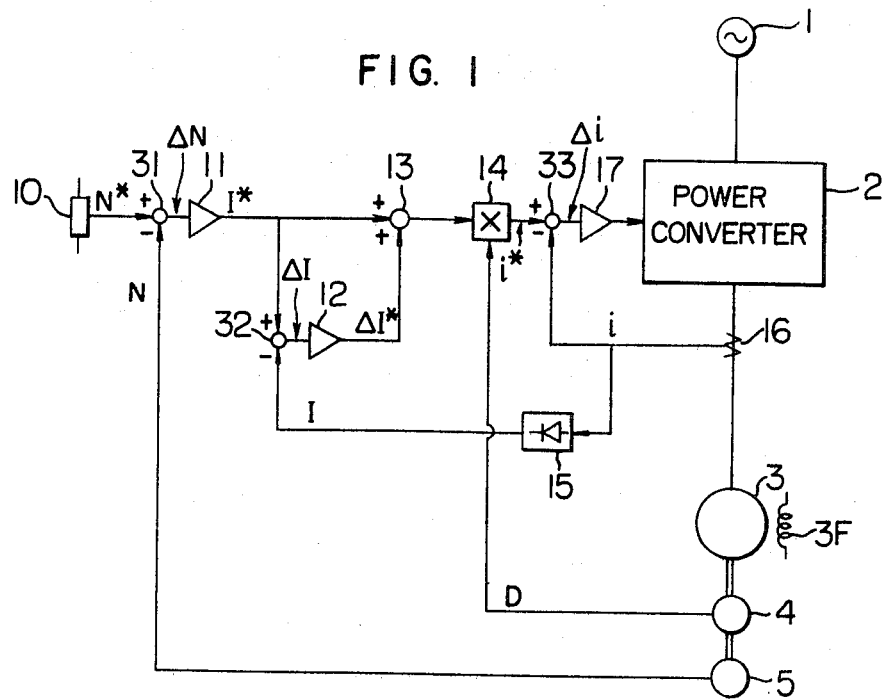
FIG. 1 is a block diagram illustrating the circuit configuration of an embodiment of the present invention.

In FIG. 1, a synchronous motor 3 is driven by a power converter 2 and a field winding 3F thereof is excited by a not-shown power supply source. The power converter 2 converts an AC output of an AC source 1 into a variable frequency AC power and supplies it to the synchronous motor 3. Mechanically directly coupled to a rotor of the power converter 2 are a position detector 4 for producing a position signal D (sinusoidal wave signal) corresponding to the relative position between field poles and an armature winding of the synchronous motor 3 and a velocity detector 5 for detecting the rotational velocity of the same. The armature current of the synchronous motor 3 is detected by a current detector 16. A comparator 31 compares a velocity command signal N* of a velocity command circuit 10 with a velocity detection signal N of the velocity detector 5 in the polarity as shown in the drawing. A velocity control circuit 11 is supplied with a velocity deviation ΔN and produces a current command signal I* instructing the magnitude of the armature current of the synchronous motor 3. The armature current detected by a current detector 16 is then rectified by a current detector 15 to be a current detection signal I which is then compared by a comparator 32 with the current command signal I*. The current deviation signal ΔI, the output of the comparator 32, is calculated in a deviation calculating circuit 12 and thereafter applied to an adder 13. The adder 13 adds the current command signal I* and the current deviation ΔI and produces a corrected current command signal (I* ±ΔI*) which is then applied to a multiplier 14. The multiplier 14 multiplies the position signal D by the corrected current command signal (I* ±ΔI*) to produce a current pattern signal i* (sinusoidal wave signal) which is the position signal D whose amplitude varies in proportion to the corrected current command signal. A comparator 33 compares the current pattern signal i* with a current detection signal i (instantaneous value) detected by the current detector 16 so as to produce the current deviation Δi therebetween which is then applied to a current control circuit 17. The current control circuit 17 applies a firing control signal for turning on/off switching elements constituting the power converter 2, in accordance with the current deviation Δi. By the way, although a firing control circuit is provided usually between the current control circuit 17 and the power converter 2, it is omitted in the drawing on the assumption that it is incorporated within the power converter 2 in this case. Further, although the multiplier 14, the comparator 33, the current detector 16, and the current control circuit 17 are shown in the drawing only for one phase, the position detector 4 produces three sets of position signals D for three phases in the case where, for example, the synchronous motor 3 is a three phase machine and therefore, needless to say, three sets of the multipliers 14, the comparators 33, the current detectors 16, and the current control circuits 17 be actually provided.

The operation of the apparatus will be next described. However, since the deviation calculating circuit 12, the adder 13, the rectifier 15, and the comparator 32 are additionally provided, according to the present invention, to a known controll apparatus, the description of the operation of the known control apparatus per se is omitted.

The current command signal I* of the velocity control circuit 11 is used for instructing the magnitude of the armature current of the synchronous motor 3. The rectifier 15 produces the current detection signal I which is proportional to the actual armature current. The comparator 32 compares the current detection signal I with the current command signal I* and produces the deviation ΔI therebetween which is then applied to the deviation calculating circuit 12. The deviation calculating circuit 12 produces the current correction signal ΔI* which is proportional to the current deviation signal ΔI. The current command signal I* and the current correction signal ΔI* are added to each other in the adder 13 so as to supply the corrected current command signal (I* ±ΔI*) to the multiplier 14. The multiplier 14 produces the current pattern signal i* which is the position signal D whose amplitude varies in proportion to the corrected current command signal. The current control circuit 17 controls the armature current of the synchronous motor 3 so that it agrees with the current pattern signal i* by turning on/off switching elements constituting the power converter 2, in accordance with the current deviation Δi of the current detection signal i from the current pattern signal i*. Thus, the armature current of the synchronous motor 3 is controlled so as to agree with the position signal D in phase and agree with the current command signal I* in magnitude.

In this manner, if there is a current deviation ΔI of the armature current actually flowing in the synchronous motor 3 from the current command signal I*, the current correction signal ΔI* which is proportional to the current deviation signal ΔI is added to the current command signal I* to obtain a desired value of the armature current. Thus, even if there is lag in frequency response in the current control system including the current control circuit 17, it is possible to cause the magnitude of the armature current to always agree with the current command signal I*. At this time, the current correction control system including the deviation calculating circuit 12 for producing the current correction signal ΔI* serves to operate as a supplementary system for the current control system. Accordingly, to determine the response of the velocity control system, it is not required to take account of the current correction control system and it is not necessary to lower the response of the velocity control system. As the result, the velocity control can be performed with high response and the design as well as adjustment of the control system can be easily attained.

Figure 2:
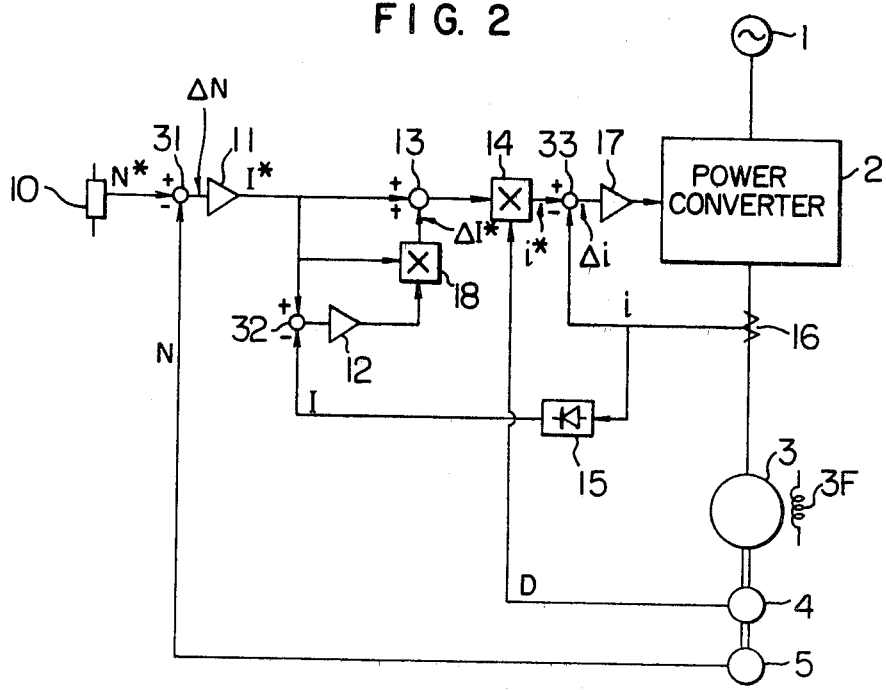
FIG. 2 is a block diagram illustrating the circuit configuration of another embodiment of the present invention.

FIG. 2 illustrates another embodiment of the present invention.

In FIG. 2, the embodiment is different from the FIG. 1 embodiment in that an output signal of a deviation calculating circuit 12 is multiplied by the current command signal I* in a multiplier 18 to obtain the current correction signal ΔI*.

In the FIG. 2 embodiment, the current correction signal ΔI* is expressed by ΔI*=I*·ΔI. That is, the current correction signal ΔI* varies in proportion to the magnitude of the current command signal I*. In this manner, the current control may be further improved in response.

The current detection signal I of a rectifier 15 contains ripple components. The deivation calculating circuit 12 effects proportion and integration operations and the response may has a certain limitation if the input signal ΔI (current detection signal I) contains ripple components. For this reason, even if there is lag in response time in the deviation calculating circuit 12, the current correction signal ΔI* varies in proportion to the magnitude of the current command signal I* so that the response may be further improved than the FIG. 1 embodiment.

Figure 3:
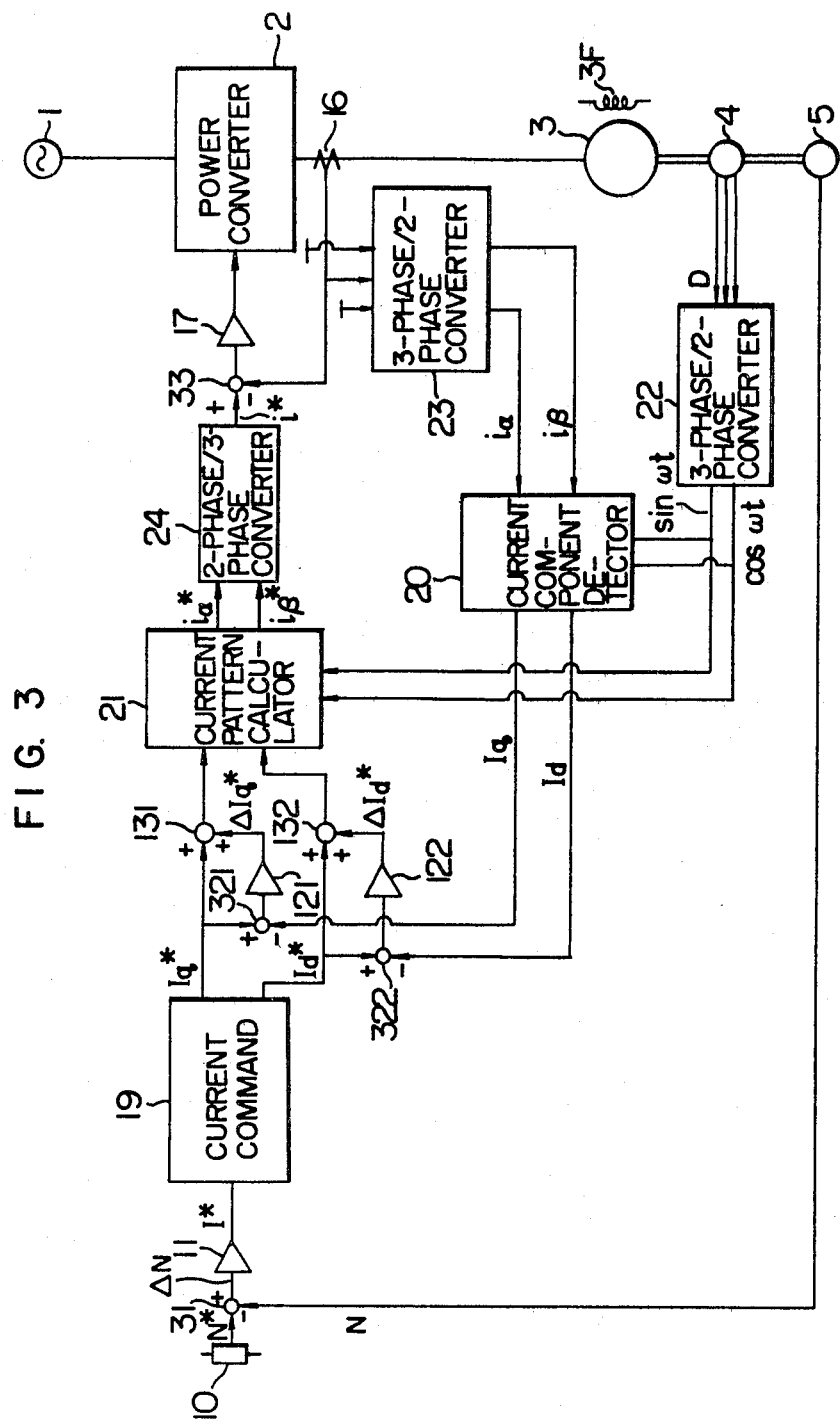
FIG. 3 is a block diagram illustrating the circuit configuration of a further embodiment of the present invention

FIG. 3 illustrates a further embodiment of the present invention, in which the armature current is decomposed into a component in the same direction as the magnetic flux of the field system and another component in the direction perpendicular to the first-mentioned direction.

In FIG. 3, the same reference numerals as used in FIG. 1 represent the same or similar parts or components. A current command circuit 19 is supplied with the current command signal I* performs the following calculation to obtain two perpendicularly intersecting components of the armature current, that is the parallel current component Id* which is parallel to the field magnetic flux and the perpendicular current component Iq* which is perpendicular to the former.

$$Iq^* = I^* \cos \delta$$
$$Id^* = I^* \sin \delta \tag{1}$$

where
$\delta = \tan^{-1} k_1 I^*$
$k_1$: constant

The perpendicular current component Iq* is applied to an adder 131 and a comparator 321, while the parallel current component Id* is applied to an adder 132 and a comparator 322.

The position signals (three-phase signals) D detected for each phase by the position detector 4 are applied to a three-phase/two-phase converter circuit 22 so as to be converted into two-phase signals sin ωt and cos ωt which are different from each other by 90 degrees in phase. The two-phase signals sin ωt and cos ωt are applied to a current component detecting circuit 20 and a current pattern calculating circuit 21. The current detection signals (three-phase signals) detected for each phase by a current detector 16 are applied to a three-phase/two-phase converter circuit 23 so as to be converted into two-phase current detection signals iα, iβ as shown by the following expressions:

$$i\alpha = I \sin(\omega t + \theta)$$

$$i\beta = -I \cos(\omega t + \theta) \qquad (2)$$

θ: phase difference
ω: rotation angular frequency

The current component detecting circuit 20 receives the current detection signals iα, iβ and the two-phase signals sin ωt and cos ωt and calculates the following equation to obtain the d-axis component Id and q-axis component Iq of the armature current:

$$\begin{pmatrix} Id \\ Iq \end{pmatrix} = \begin{pmatrix} \sin\omega t & -\cos\omega t \\ \cos\omega t & \sin\omega t \end{pmatrix} \begin{pmatrix} i\alpha \\ i\beta \end{pmatrix} \qquad (3)$$

The current component detecting circuit 20 may attain the calculation of the equation (3) by using four multipliers.

The component detection signal Iq and d-axis component detection signal Id detected by the current component detecting circuit 20 are applied to comparators 321 and 322 respectively so as to be compared with the q-axis component command signal Iq* and the d-axis component command signal Id* respectively. The current deviation signals Δig and Δid produced by the comparators 321 and 322 are applied to deviation calculating circuits 121 and 122 respectively so as to obtain the q-axis component correction signal ΔIq* and d-axis component correction signal ΔId* respectively. The q-axis component command signal Iq* and the q-axis component correction signal ΔIq* are added to each other in the adder 131 so as to obtain the q-axis component corrected current command signal (Iq*+ΔIq*), while the d-axis component command signal Id* and the d-axis component correction signal ΔId* are added to each other in the adder 132 so as to obtain the d-axis component corrected current command signal (Id*+ΔId*). The q-axis component and d-axis component current command signals are applied to the current pattern calculating circuit 21. The current pattern calculating circuit 21 receives the q-axis component and d-axis component current command signals and performs coordinate transformation to obtain AC current command signals iα* and iβ* in accordance with the following equation:

$$\begin{pmatrix} i\alpha^* \\ i\beta^* \end{pmatrix} = \begin{pmatrix} \sin\omega t & \cos\omega t \\ -\cos\omega t & \sin\omega t \end{pmatrix} \begin{pmatrix} Id^* + \Delta Id^* \\ Iq^* + \Delta Iq^* \end{pmatrix} \qquad (4)$$

The AC current command signals iα* and iβ* are converted into three-phase current pattern signals through a two-phase/three-phase converter circuit 24. In FIG. 3, the three-phase current pattern signals are generally illustrated as the current pattern signal i* for one pase.

The current pattern signal i* is compared with the current detection signal i by the comparator 33 which produces the current deviation Δi. The current deviation Δi is applied to the current control circuit 17 which controls the power converter 2 by turning on/off the switching elements constituting the converter 2, in the same manner as in the FIG. 1 embodiment. Although FIG. 3 shows the control circuit only for one phase, control is made in the same manner for the other two phases. Thus, it is possible to cause the magnitude of the armature current of the synchronous motor 3 to agree with the current command signal I* independent of the frequency response in the current control system and to make the generated torque of the synchronous motor 3 be a desired value.

Thus, the desired effect can be obtained also in this embodiment in which the armature current of a synchronous motor is decomposed into a component parallel to the field magnetic flux and another component perpendicular to the former and these components are individually controlled to perform the motor control.

Alternatively, in the FIG. 3 embodiment, the correction signal may be obtained by multiplying the q-axis component command signal Iq* by the q-axis component correction signal ΔIq* and multiplying the d-axis component command signal Id* by the q-axis component correction signal ΔId*, similarly to the FIG. 2 embodiment.

Figure 4:
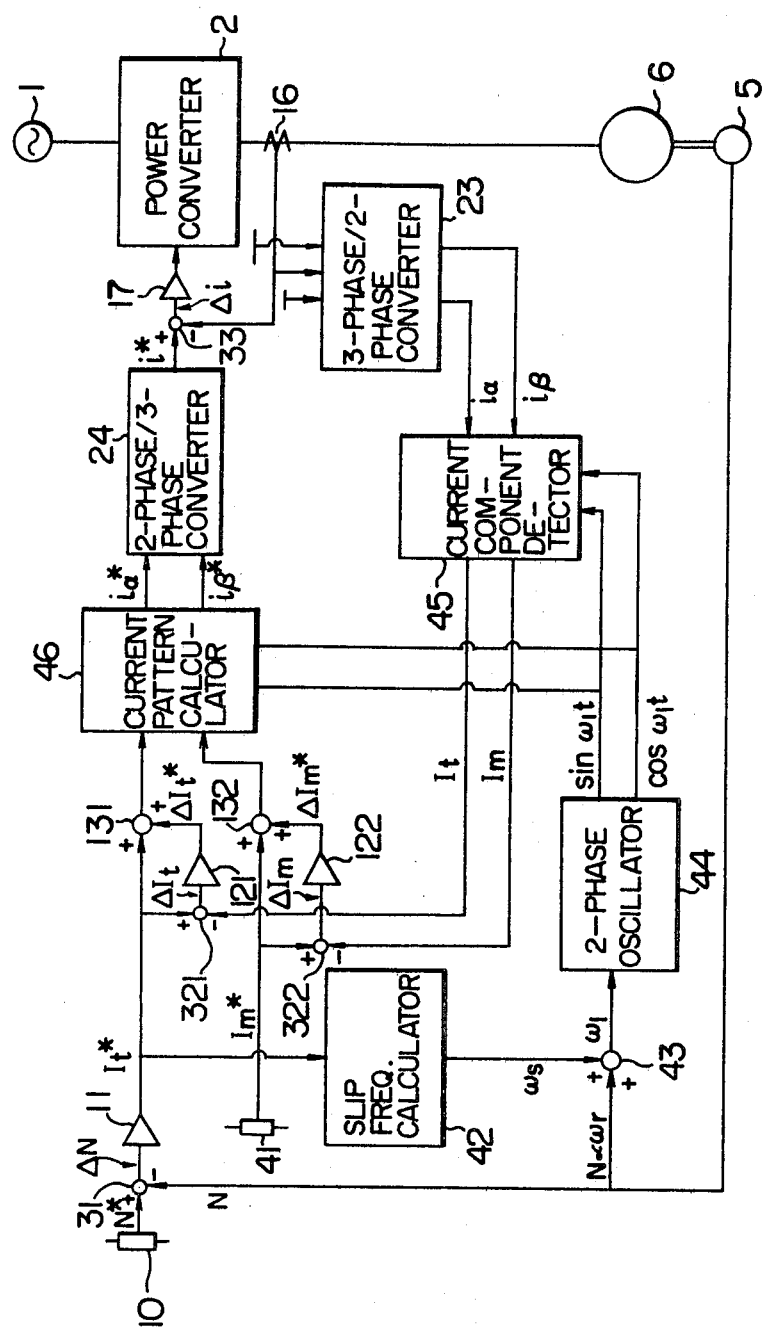
FIG. 4 is a block diagram illustrating the circuit configuration of a still further embodiment of the present invention.

FIG. 4 shows a still further embodiment, in which the present invention is applied to a control system in which an induction motor is driven by a power converter.

FIG. 4 illustrates an example in which the primary current of an induction motor is decomposed into a torque component and an excitation component (constant value) so at these components are individually controlled.

In FIG. 4, the same numerals as used in FIG. 3 denote the same or similar parts or components, and an induction motor 6 is driven by a power converter 2. A velocity control circuit 11 receives the velocity command signal N* and the velocity detection signal N and produces the torque component command It* for the primary current. The torque component command It* is applied to an adder 131, a comparator 321 and a slip frequency calculating circuit 42. The excitation component command Im* produced from an excitation component command circuit 41 is applied to an adder 132 and a comparator 322. Receiving the torque component command It*, the slip frequency calculating circuit 42 calculates the slip frequency command ωs* from the following equation (5).

$$\omega s^* = k_2 It^* \qquad (5)$$

k₂: constant

The slip frequency command ωs* and the velocity detection signal N (which is proportional to the rotary frequency ωr) are added to each other in an adder 43. The adder 43 produces the primary frequency command ω₁* which is applied to a two-phase oscillator 44. The two-phase oscillator 44 produces two-phase sinusoidal signals, sin ω₁t and cos ω₁t, with a frequency equal to the primary frequency command ω₁* and with a predetermined amplitude. These two-phase signals are applied to a current component detector circuit 45 and a current pattern calculating circuit 46. The current component detector circuit 45 receives the current detection signals iα and iβ and of a three-phase/two-phase converter circuit 23 and the two-phase sinusoidal signals sin ω₁t and cos ω₁t and calculates the torque component It and the excitation component Im of the primary current i from the following equation:

$$\begin{pmatrix} Im \\ It \end{pmatrix} = \begin{pmatrix} \sin\omega_1 t & -\cos\omega_1 t \\ \cos\omega_1 t & \sin\omega_1 t \end{pmatrix} \begin{pmatrix} i\alpha \\ i\beta \end{pmatrix} \qquad (6)$$

The current component detecting circuit 45 may be the same one as indicated by 20 in FIG. 3.

The torque component It detected in the current component detecting circuit 45 is inputted to the comparator 321 and the excitation component Im is applied to the component 322. The current deviations ΔIt and ΔIm respectively produced from the comparators 321 and 322 are applied to deviation calculating circuits 121 and 122 so as to derive the torque component correction signal ΔIt* and the excitation component correction signal ΔIt* respectively. An adder 131 adds the torque component command signal It* and the torque component correction signal ΔIt* to each other so as to obtain the corrected torque current command signal (It*+ΔIt*), while another adder 132 adds the excitation component command signal Im* and the excitation component correction signal ΔIm* to each other so as to obtain the corrected excitation current command signal (Im*+ΔIm*). These corrected torque and excitation current command signals are applied to the current pattern calculating circuit 46 which in turn effects the coordinate transformation in accordance with the following equation so as to obtain the AC current command signal iα* and iβ*:

$$\begin{pmatrix} i\alpha^* \\ i\beta^* \end{pmatrix} = \begin{pmatrix} \sin\omega_1 t & \cos\omega_1 t \\ -\cos\omega_1 t & \sin\omega_1 t \end{pmatrix} \begin{pmatrix} Im^* + \Delta Im^* \\ It^* + \Delta It^* \end{pmatrix} \quad (7)$$

The AC current command signals iα* and iβ* are converted into three-phase AC current command signals through a two-phase/three-phase converter circuit 24. In FIG. 4, the three-phase AC current command signals are generally illustrated as the current pattern signal i* for one phase.

The current pattern signal i* is compared with the current detection signal i by a comparator 33 which produces the current deviation Δi. The current deviation Δi is then applied to a current control circuit 17 which controls the power converter 2 by turning on/off the switching elements constituting the converter 2, thereby controlling the primary current. Thus, it is possible to control the magnitude of the primary current of the induction motor 1 to be the value determined by the torque component command signal It* and the excitation component command signal Im* independently of the frequenc response of the current control system, enabling the generated torque of the induction motor 6 to be a desired value.

Thus, the desired effect can be obtained also in this embodiment in which the primary current of an induction motor is decomposed into a torque component and an excitation component so that these components are individually controlled.

Further, although a current correction system is provided in each of the torque current control system and the excitation current control system in the FIG. 4 embodiment, it may be provided only in the torque current control system in the case the excitation component deviation ΔIm is small.

Further, the invention is of course applicable in the case the excitation component Im* is not maintained constant but arranged to be variable. In this case, however, it is necessary to cause the slip frequency calculating circuit to receive the torque component command It* and the excitation component command Im* so as to obtain the slip frequency ωs.

FIG. 5 shows another embodiment.

In the FIG. 5 embodiment, the present invention is applied to an example in which the magnitude, the phase and the frequency of the primary current of an induction motor are individually commanded.

In FIG. 5, the same numerals as used in FIG. 4 denote the same or similar parts or components. In FIG. 5, the torque component command signal It* of a velocity control circuit 11 and the excitation component command Im* of an excitation component command circuit 41 are applied to a current command circuit 51. The current command circuit 51 calculates the following equation to produce the current command signal I₁*:

$$I_1^* = \sqrt{(It^*)^2 + (Im^*)^2} \quad (8)$$

The current command signal I₁* is applied to an adder 13 and a comparator 32. The comparator 32 is further supplied with the current detection signal I₁, which has been obtained in a rectifier 15, so as to produce the deviation ΔI₁ of the current detection signal I₁ from the current command signal I₁*. The deviation ΔI₁ is applied to a deviation calculating circuit 12 which in turn produces and applies the current correction signal ΔI₁* in accordance with the current deviation ΔI₁ to the adder 13. The adder 13 adds the current command signal I₁* and the current correction signal ΔI₁* to each other so as to produce and applies the corrected current command signal (I₁*+ΔI₁*) to a multiplier 14.

A phase command circuit 52 receives the torque component command signal It* and produces the current phase command signal α* which is expressed as follows:

$$\alpha^* = \tan^{-1} k_3 It^* \quad (9)$$

k₃: constant

A two-phase oscillator 44 produces two-phase signals sin ω₁t and cos ω₁t of the same frequency as the primary frequency command ω₁ and applies then to a phase shifter 53 in the same manner as in the FIG. 4 embodiment. The phase shifter 53 phase-shifts the two-phase signals sin ω₁t and cos ω₁t by the value corresponding to the current phase command signal α* so as to produce and applies the signals sin (ω₁t+α*) and cos (ω₁t+α*) to a two-phase/three phase converter circuit 54. The two-phase/three phase converter circuit 54 may be such as shown in FIG. 7 of U.S. Pat. No. 3,824,437. The two-phase/three phase converter circuit 54 obtains the current reference signal ip for each phase and applied it to the multiplier 14 individually provided for each phase. The multiplier 14 multiplies the corrected current command signal (i₁*+ΔI₁*) by the current reference signal ip so as to produce the current pattern signal i₁* which is the current reference signal ip the amplitude of which varies in proportion to the corrected current command signal. Controlling the primary current of the induction motor 6 in accordance with the thus obtained current pattern signal i₁*, it is possible to quickly make the primary current of the induction motor 6 agree with the current command signal I₁* independently of the frequency response of the current control system including the current control circuit 17.

Thus, the desired effect can be obtained also in this embodiment in which the magnitude, phase and frequency of the primary current of an induction motor is individually commanded so as to effect the velocity control.

Alternatively, the FIG. 5 embodiment may of course be modified such that the product of the current command signal $I_1^*$ and the current correction signal $\Delta I_1^*$ may be applied to the adder 13 similarly to the FIG. 2 embodiment.

As described above, according to the present invention, if the armature current actually flowing in an AC motor deviates from the current command signal, the current correction signal proportional to the current deviation is added to the current command signal so as to provide the target value of the motor current. Accordingly, it is possible to cause the magnitude of the motor current to always agree with the current command signal so as to produce desired torque.

Further, in order to determine the response of the control system for producing the current command signal, it is not necessary to account of the current correction control system for obtaining the current correction signal, resulting in simplification in design and adjustment of the control system.

Although analog configuration is employed in the embodiments described above, the present invention may of course be applied to the case where desital controls are performed by using such as a microprocessor.

We claim:

1. A control apparatus for an AC motor comprising:
(a) an AC motor driven by a power converter;
(b) current command means for producing a current command signal to instruct the magnitude of a motor current to be supplied to said AC motor;
(c) current pattern calculating means for obtaining a current pattern signal based on a sinusoidal signal which determines a phase of said motor current;
(d) current control means for controlling said power converter so as to cause said motor current to agree with said current pattern signal;
(e) current detecting means for detecting said motor current to produce a current detecting signal;
in which said apparatus further comprises;
(f) current correction control means for obtaining a current deviation of said current detecting signal from said current command signal so as to produce a current correction signal proportional to said current deviation and adding said current correction signal to said current command signal so as to apply the sum to said current pattern calculating means.

2. A control apparatus for an AC motor comprising:
(a) an AC motor driven by a power converter;
(b) current command means for producing a current command signal to instruct the magnitude of a motor current to be supplied to said AC motor;
(c) current pattern calculating means for obtaining a current pattern signal based on a sinusoidal signal which determines a phase of said motor current;
(d) current control means for controlling said power converter so as to cause said motor current to agree with said current pattern signal;
(e) current detecting means for detecting said motor current to produce a current detecting signal;
in which said apparatus further comprises;
(f) current correction control means for obtaining a current deviation of said current detecting signal from said current command signal so as to produce a current correction signal proportional to said current deviation and said current command signal and for adding said current correction signal to said current command signal so as to apply the sum to said current pattern calculating means.

3. A control apparatus for an AC motor comprising:
(a) an AC motor driven by a power converter;
(b) current command means for producing a current command signal to instruct the magnitude of a component parallel to field magnetic flux of said motor and another component perpendicular to said parallel component, of a motor current to be supplied to said AC motor;
(c) current pattern calculating means for obtaining a current pattern signal based on a sinusoidal signal which determines a phase of said motor current, and said current command signal including the parallel component command and perpendicular component command;
(d) current control means for controlling said power converter so as to cause said motor current to agree with said current pattern signal;
(e) current detecting means for detecting the respective magnitudes of said parallel and perpendicular components of said motor current;
(f) current correction control means for obtaining a first current deviation of the detected magnitude of said parallel component of said motor from said parallel component current command and a second current deviation of the detected magnitude of said perpendicular component of said motor from said perpendicular component current command and for adding said first and second deviations to said parallel and perpendicular component current commands, respectively, so as to apply the respective sums to said current pattern calculating means.

* * * * *